United States Patent [19]
Uriu et al.

[11] Patent Number: 5,408,461
[45] Date of Patent: Apr. 18, 1995

[54] PATH ROUTE TEST APPARATUS FOR USE IN AN ATM TRANSMISSION SYSTEM

[75] Inventors: Shiro Uriu; Satoshi Kakuma; Shuji Yoshimura, all of Kanagawa, Japan

[73] Assignee: Fujitsu Limited, Kanagawa, Japan

[21] Appl. No.: 215,313

[22] Filed: Mar. 21, 1994

[30] Foreign Application Priority Data

Mar. 19, 1993 [JP] Japan .................. 5-060739

[51] Int. Cl.6 .................. H04J 3/14; H04L 1/24; H04L 12/26
[52] U.S. Cl. .................. 370/14; 371/20.1; 371/20.4
[58] Field of Search .................. 370/13, 14, 17, 60, 370/60.1, 94.1, 94.2; 371/20.1, 20.4

[56] References Cited

U.S. PATENT DOCUMENTS

| | | | |
|---|---|---|---|
| 5,257,311 | 10/1993 | Naito et al. | 370/13 |
| 5,299,209 | 3/1994 | Murayama et al. | 371/20.1 |
| 5,331,628 | 7/1994 | Cheng et al. | 371/20.1 |
| 5,343,463 | 8/1994 | van Tetering et al. | 370/13 |

*Primary Examiner*—Wellington Chin

[57] ABSTRACT

An ATM transmission system transmits cell-formatted data in an asynchronous transfer mode, and aims at conducting an online path route test in the system. If one path route only is established in the system, then one or more valid cell detecting units for detecting, upon receipt of a cell enable signal indicating that a valid cell to pass through the path route has been sent, the arrival of a valid cell are provided at an optional point including an ATM switch in the path route so that the path route can be partially or entirely validity-checked. If plurality of valid path routes are established, the system provides, in addition to the valid cell detecting units, a virtual path identifier and virtual channel identifier comparing unit for comparing values of the VPI and VCI stored therein with values of a VPI and a VCI added to an arriving cell, and a path route validity check unit for partially or entirely validity-checking a path route in the ATM transmission system.

19 Claims, 7 Drawing Sheets

PATH ROUTE TEST APPARATUS FOR USE IN AN ATM TRANSMISSION SYSTEM

BACKGROUND OF THE INVENTION

1. Field of the Invention

The present invention relates to en ATM (asynchronous transfer mode) transmission system for transmitting cell-formatted data in an asynchronous transfer mode, and more specifically to an ATM transmission system capable of conducting an online path route test to check easily the validity of a path route in a system.

2. Description of the Related Art

In a transmission system for transmitting data using ATM cells, data are contained in an ATM cell having a limed length of 53 bytes. The header of the ATM cell is provided with a virtual path identifier (VPI) and a virtual channel identifier (VCI) at its initial portion, and applied to a switching unit in the transmission system. In the transmission system, the data are switched using switching information corresponding to the values of the VPI and VCI, and then transmitted to a receiver of the data.

In conducting a path route test on such an ATM transmission system, there has been a problem that it is very difficult to determine externally whether or not an ATM cell transmitted from a subscriber is being transmitted through a path specified by the software. Another problem with the conventional system is that a cell itself or a transmission error can be hardly located during the transmission at the debugging of the system.

SUMMARY OF THE INVENTION

The present invention aims at conducting an online test on a path route in an ATM cell transmission system for asynchronously transmitting cells during the actual system operation.

According to the present invention, a valid cell detector for detecting the arrival of a valid cell, a VPI/VCI comparing unit for comparing values of VPIs and VCIs as explained later, and a path route validity check unit for validity-checking a path route are provided at an input portion and/or an output portion of an ATM switch for switching ATM cells, or provided at an optional point including the ATM switch in a plurality of path routes, for example at an input portion of an interface, multiplexer, demultiplexer, etc. Generally, a plurality of valid cell detectors, VPI/VCI comparing units, and path route validity check units are provided at a plurality of points in the path routes. For example, a path route test can be conducted about the validity between an input terminal unit and the input portion of the ATM switch, between the input portion of the ATM switch and the output portion of the demultiplexer provided at the output portion of the ATM switch.

The valid cell detector receives a cell enable signal indicating that a valid cell has been sent and detects the arrival of the valid cell. The VPI/VCI comparing unit stores the values of a VPI and VCI added to n call to pass through it, compares them with those of the VPI and VCI added to the cell that has just arrived, and determines whether or not they match respectively. Furthermore, an AND gate as the path route validity check unit outputs, for example, "1" as a path route validity check result when the valid cell detector detects the arrival of a valid cell and the VPI/VCI comparing unit detects coincidences of values of the VPIs and VCIs.

According to the present invention, the ATM transmission system further comprises at an optional point in the system a test cell generating device for sending a path route test cell in addition to the valid cell detector, the VPI/VCI comparing unit, and the path route validity check unit. With the configuration, tested is the validity of a path route between the position of the test cell generating device and any point in the path route using a rest cell.

If only one path route is established in an ATM transmission system, then the path route can be validity-checked by simply detecting the arrival of a valid cell at any point in the path route. In this case, the path route can be validity-checked by providing a valid cell detector at any point in the path route. If a test cell generating device is provided at any point in the system, the path route can be validity-checked between the test cell generating device and the valid cell detector.

DESCRIPTION OF THE PREFERRED EMBODIMENTS

Figure 1:
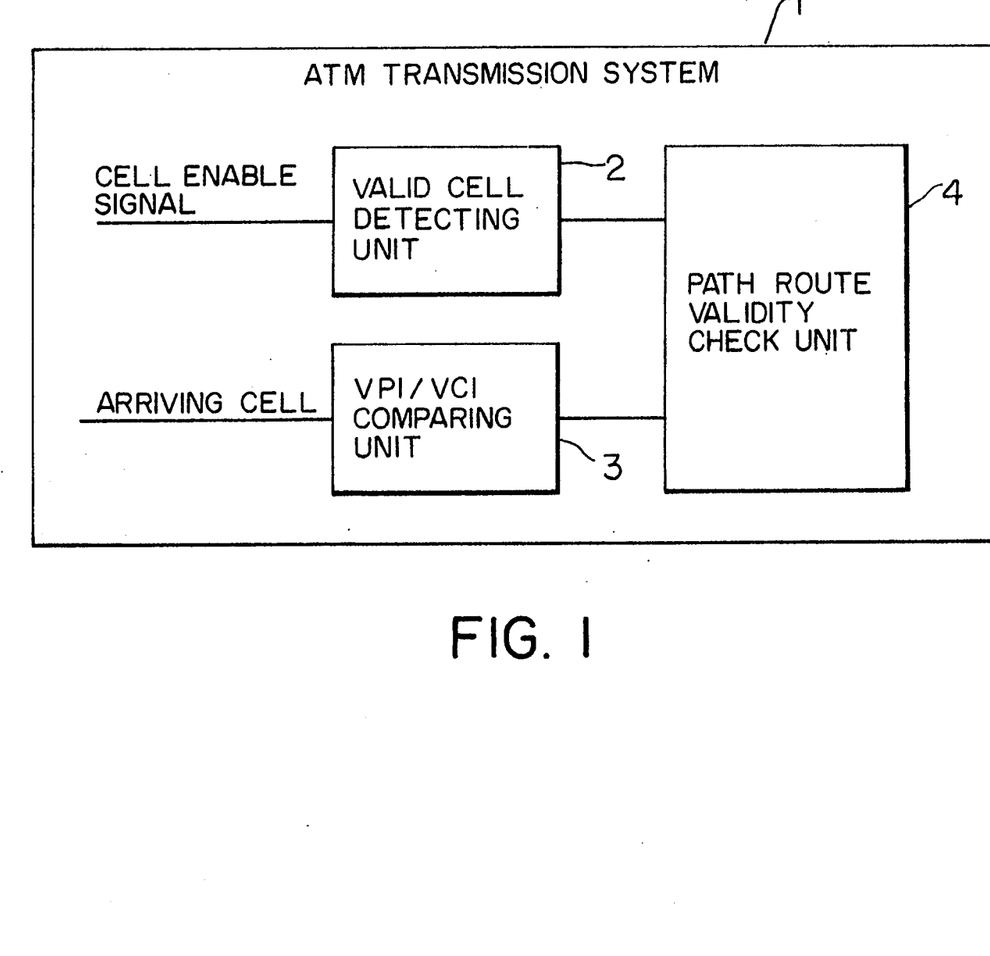
FIG. 1 is the block diagram showing the principle of the present invention.

FIG. 1 is the block diagram showing the principle of the present invention. It illustrates the principle of a path route test performed by the ATM transmission system for transmitting cell-formatted data in an asynchronous transmission mode.

By referring to FIG. 1, explained is an ATM transmission system 1 having a plurality of paths established therein. A valid cell detecting unit 2 can be, for example, a valid cell detector, and receives a cell enable signal indicating that a valid cell has been sent and detects the arrival of the valid cell.

A VPI/VCI comparing unit 3 and a path route validity check unit 4 are provided at one or more points in a system together with the valid cell detecting unit 2. The VPI/VCI comparing unit 3 stores in, for example, a VPI/VCI table a set of a virtual path identifier (VPI) and a virtual channel identifier (VCI) added to a cell to be transmitted through the points at which these units are provided, and compares using a comparator the values of the VPI and VCI with those added to the cell which has just arrived and retrieved by, for example, the VPI/VCI monitor. The path route validity check unit 4 validity-checks a path route in a system when the valid cell detecting unit detects the arrival of a valid cell and the VPI/VCI comparing unit 3 detects a coincidental result about the values of the VPIs and VCIs. This unit can be, for example, an AND gate.

If one path only is established in an ATM transmission system, only one set of values are determined, thereby requiring no comparison between the values, and a path route in the system can be validity-checked by providing valid cell detecting units 2 for detecting the arrival of a valid cell at one or more points in the ATM transmission system.

The present invention conducts an online path route test in an ATM transmission system. Normally, if a plurality of paths are established in an ATM transmission system, then the VPI/VCI comparing unit 3 for comparing tile values of VPIs and VCIs and the path route validity check unit 4 are provided at any necessary points in the system in addition to the valid cell detecting unit 2 for detecting the arrival of a valid cell. A path route can be validity-checked to the point where the path route validity check unit 4 is positioned if a valid cell detector forming part of the valid cell detecting unit 2 receives a cell enable signal and detects the arrival of a valid cell, and the values of the VPI and VCI stored in the table in the VPI/VCI comparing, unit 3 and added to a cell to be transmitted coincide with those added to the cell which has just arrived.

Furthermore, according to the present invention, for example, a test cell generating device for sending a path route test cell can be provided at an input portion of a transmission system so that a test cell having a value of a specific virtual channel identifier (VCI) can be sent and the path route can be validity-checked at each point through which the test cell passes. Furthermore, a bit stack can be monitored, that is, a fault in a bit line can be monitored, by using two test cells in which complements are set to each other as a VCI value.

Figure 2:
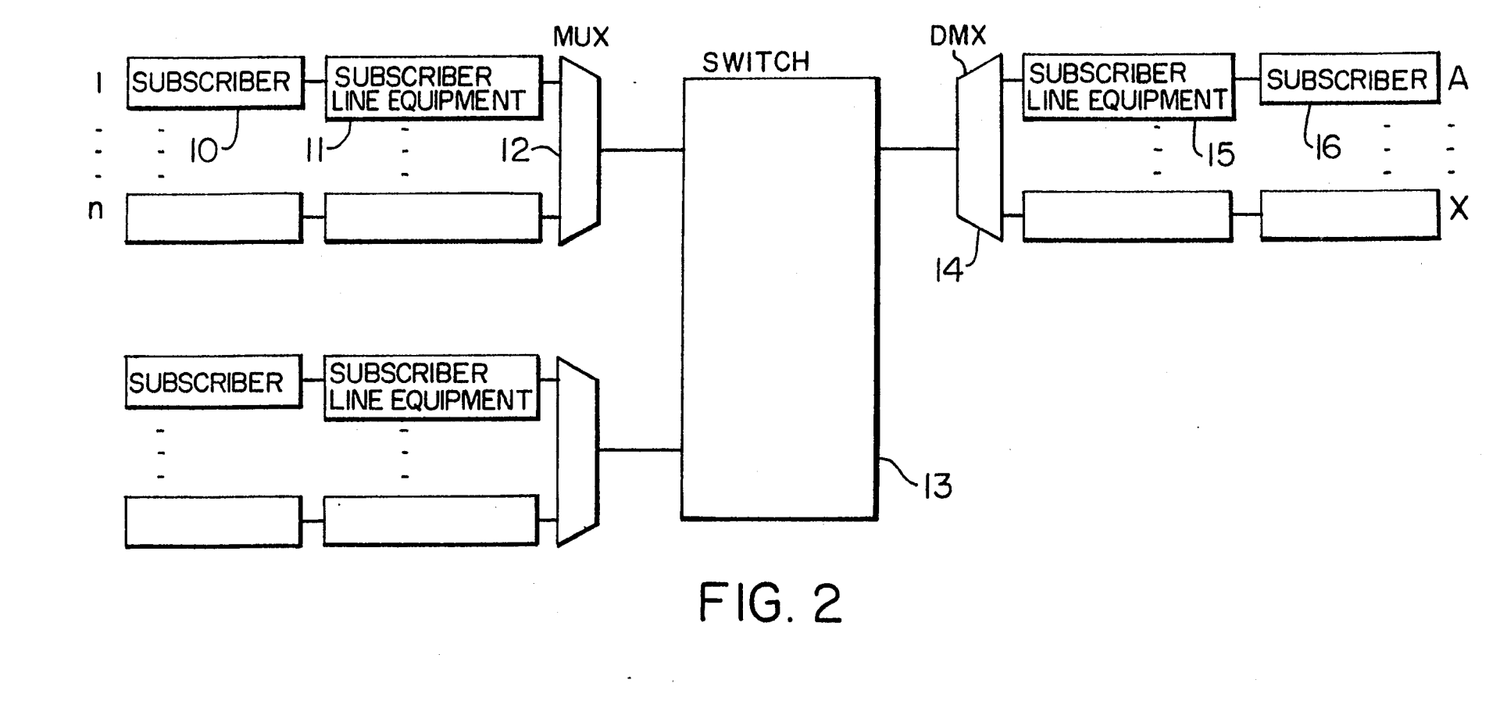
FIG. 2 is the block diagram showing the general configuration of the ATM transmission system.

FIG. 2 is tile block diagram of the general configuration of the ATM transmission system. In FIG. 2, for example, data sent by a subscriber 10 are multiplexed by a multiplexer 12 through a subscriber line equipment 11, switched in an ATM cell format by a switch unit 13, and sent to a receiving subscriber 16 through a demultiplexer 14 and a subscriber line equipment 15.

Figure 3A:
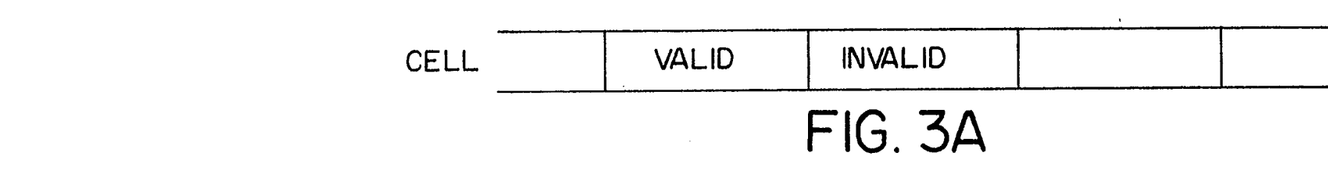
FIG. 3 is an explanatory view of a cell frame signal and a cell enable signal.
Figure 3B:
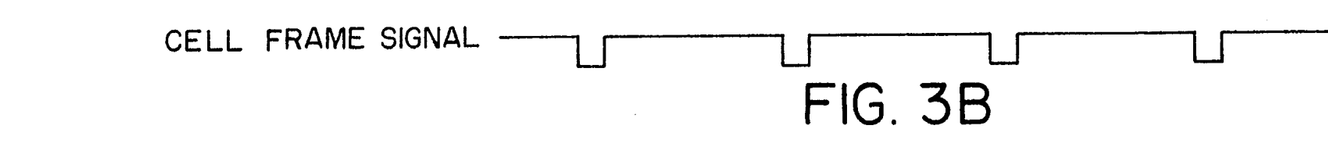
Figure 3C:
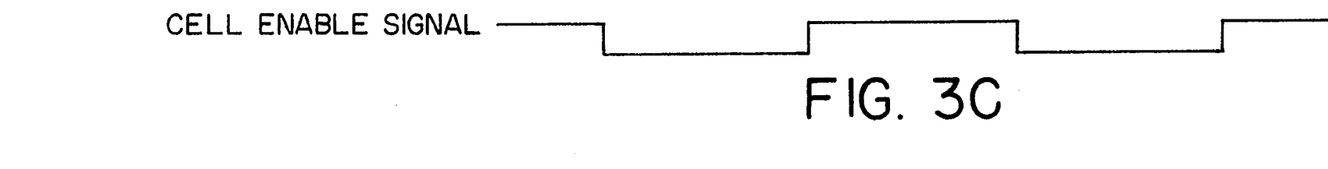

FIG. 3 is an explanatory view of a cell frame signal indicating the header portion of a cell and a cell enable signal indicating a valid or invalid cell. In FIG. 3, the dell enable signal indicates "L" for a valid cell, and "H" for an invalid cell.

Figure 4:
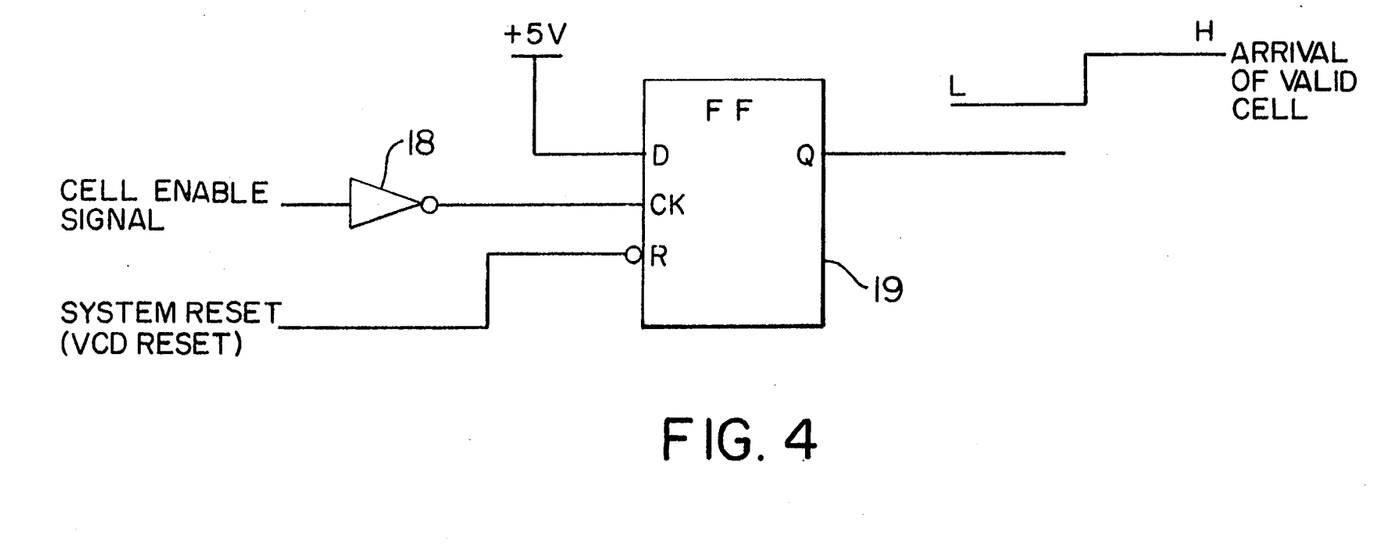
FIG. 4 is the block diagram showing the configuration of the valid cell detector.

FIG. 4 is the block diagram showing the configuration of the valid cell detector for detecting the arrival of a valid cell. If one path only is established in the transmission system shown in FIG. 2, then a cell having a virtual path identifier (VPI) and a virtual channel identifier (VCI) specified for a line forming part of the path can be transmitted as a valid cell. In this case, the arrival of a valid cell can be detected at a point in the system through which the cell passes. For example, it can be detected in a subscriber line, an input/output portion of a switch unit, an output line, etc.

The valid cell detector shown in FIG. 4 is provided at any point in the system, receives an inverse signal of a cell enable signal at a clock terminal of a flipflop 19 through an inverter 18, and detects the arrival of a valid cell. That is, a cell enable signal is 53 bytes in width (as wide as a cell), indicates "H" for a clock input value for a valid cell, thereby setting the flipflop 19.

An LED is provided for each of a plurality of valid cell detectors so that the LED can be lighted when a valid cell arrives. An output of the valid cell detector can be sent to a software interface unit to send it as one piece of status data to the software. With the configuration, an output of the valid cell detector can be displayed, and a path route can be validity-checked without any additional measuring unit.

In FIG. 4, when a plurality of valid cells arrive intermittently as shown in FIG. 3, FF19 is not reset in a cell unit because the present invention determines the penetrability of cells in a system, and only detects the arrival of cells. Therefore, for example, the LED of the system remains ON until the system is reset.

In an ATM transmission system, a plurality of paths are normally established. In this case, a table for storing virtual path identifiers (VPI) and virtual channel identifiers (VCI) added to cells passing through any points in the system is provided so that a path route to each point can be validity-checked when a valid cell has arrived by comparing the contents of the table with the values of the VPI and VCI actually transmitted in the ATM cell.

Figure 5:
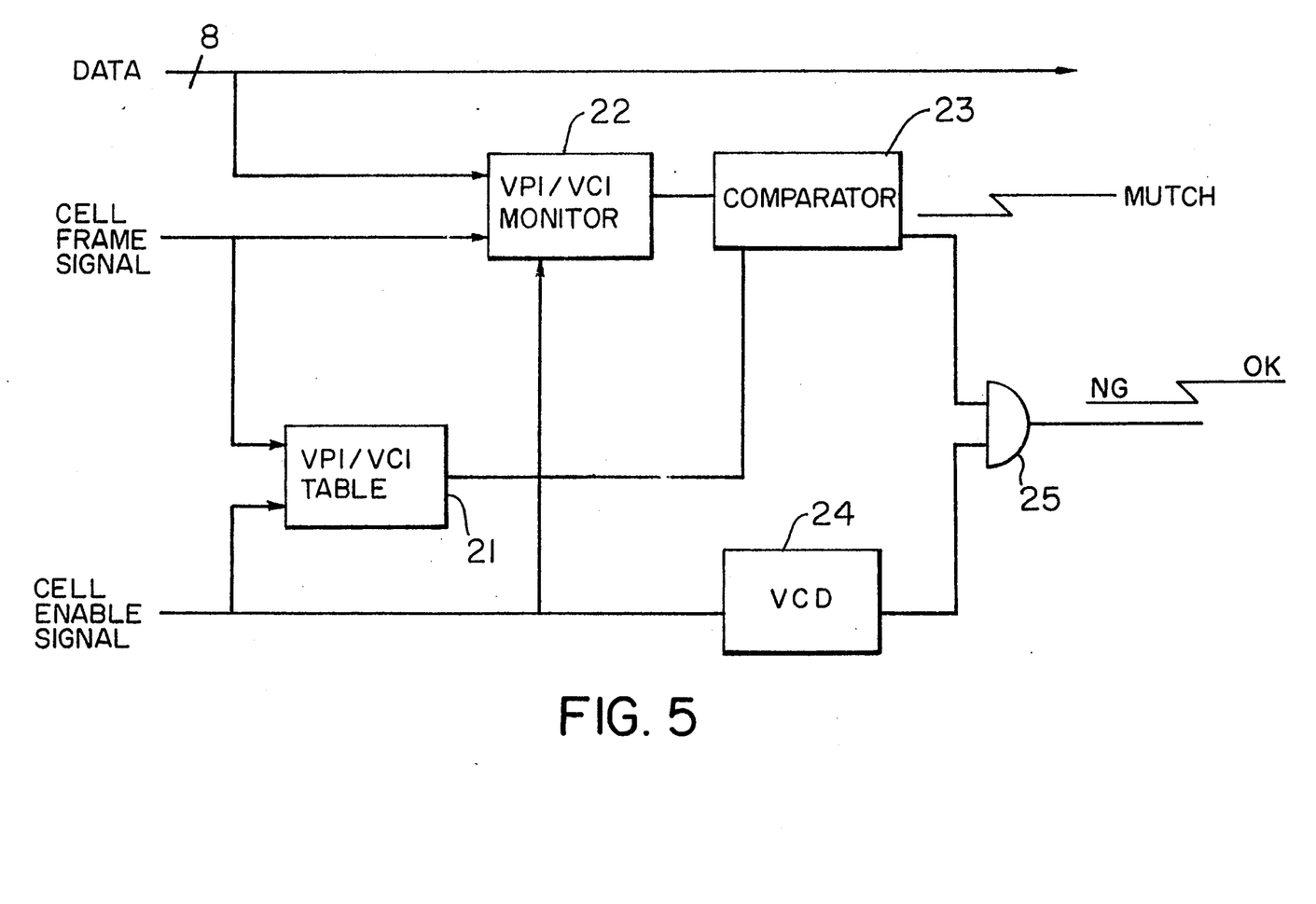
FIG. 5 is the block diagram showing the configuration of the path route test device.

FIG. 5 is the block diagram showing the configuration of the path route test device. In FIG. 5, the path route test device comprises a VPI/VCI table 21 for storing the values of VPIs and VCIs added to cells to pass through the path route test device, a VPI/VCI monitor 22 for retrieving the values of the VPI and VCI from a cell which has arrived, a comparator 23 for comparing the contents of the VPI/VCI table 21 with the retrieved values of a VPI and a VCI, a valid cell detector 24 for detecting the arrival of a valid cell, and an AND gate 25 for receiving outputs of the comparator 23 and the valid cell detector 24, and outputting a validity check result for a path route. The contents of the VPI/VCI table 21 are set according to the host-computer not shown in FIG. 5.

Thus, even when a plurality of paths are established in a system, paths are tested one by one, and only one set of values are stored in the VPI/VCI table 21 in each test. When another path is tested, a VPI and a VCI are set correspondingly.

In the present invention, for example, an input line of the system has abilities of generating a test cell different from a normal data-transmission cell, and the system receives a test cell having a specific VCI value, thereby performing a test on a path up to any output line. The VPI/VCI table 21 in the path route test device provided in an optional point in the path stores a set value of a VCI for use in the path route validity check. The value of the VCI can be preliminarily set corresponding to the system, or can be selected from the values not currently used by the software.

Two values which are complements to each other can be used as values of the VCI. For example, the values can be 5555 (HEX) and AAAA. These values are valid when each byte, that is, eight bits, is transmitted in parallel, and are used in monitoring a fault of a bit stack, that is, a bit line. When a bit line is faulty, an output to a specific bit line is constantly fixed to "0" or "1" thus realizing a monitoring of a faulty bit, that is, a bit stack, using two VCIs which are complements to each other.

Figure 6A:
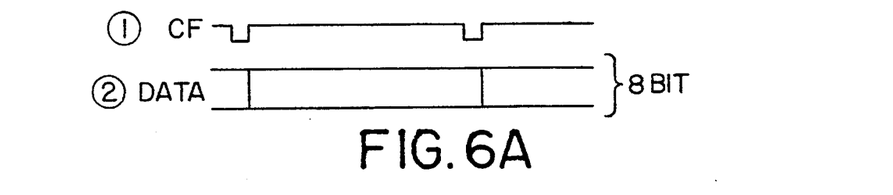
FIG. 6 shows the configuration of the circuit in which a cell enable signal is generated.
Figure 6B:
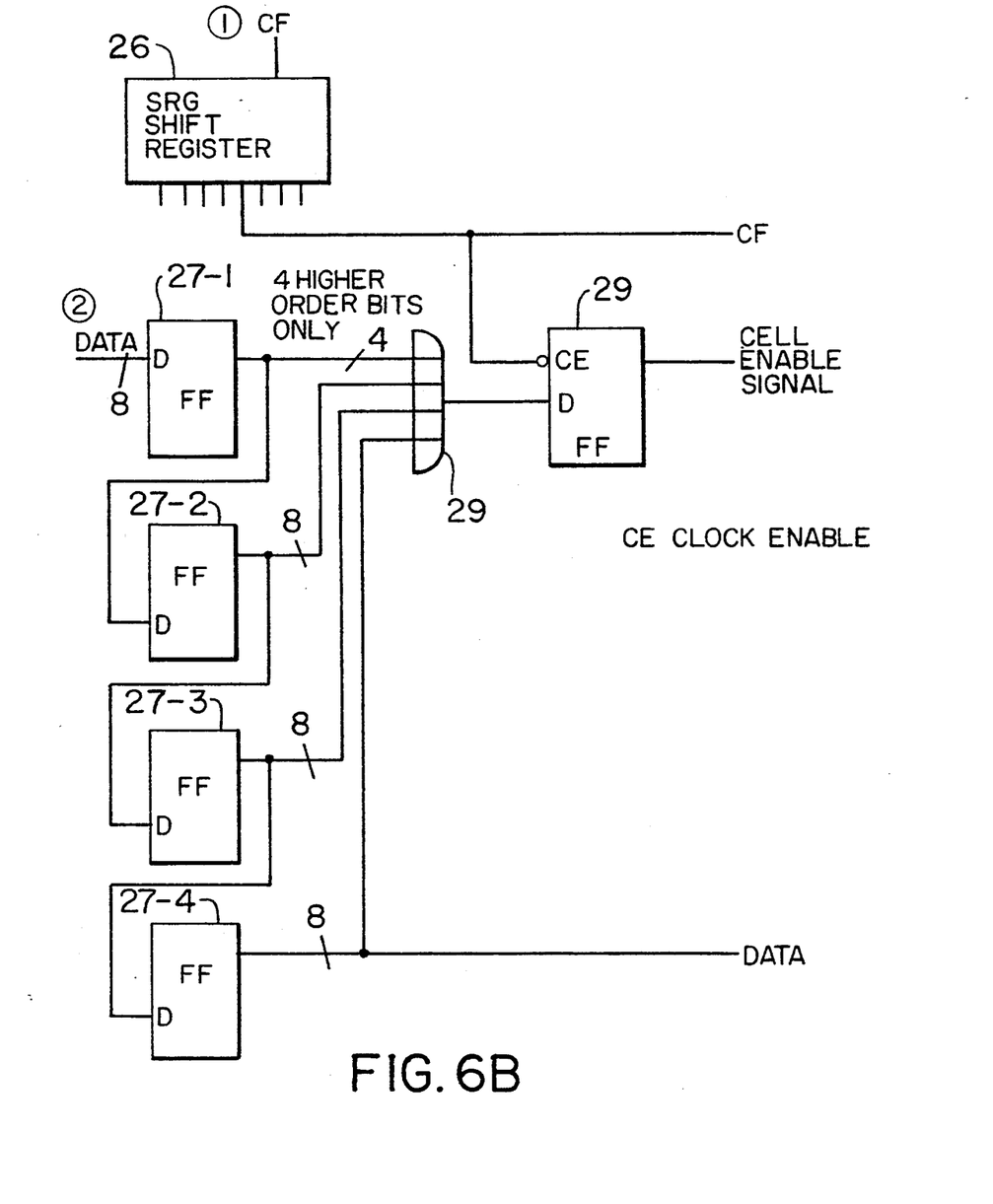

FIG. 6 shows the circuit in which a cell enable signal is generated. The circuit is provided in all subscriber line equipments shown in FIG. 2. A cell frame signal (CF) is input to a shift register 26 and is output upon the fourth output thereof. Data of an input ATM cell is applied to flip-flop 27-1 and then sequentially input to flip-flop 27-2 to 27-4. The outputs of flip-flops 27-1 to 27-4, i.e. 28-bit data and input to an OR circuit 28. With regard to the flip-flop 27-1 only 4 upper bit are used because the total of the VPI comprising 12 bits and the VCI comprising 16 bits is 28 bits. If the OR circuit 28 detects that the value of the VPI/VCI in the header of the input ATM cell is all "0", then the cell is determined to be invalid. Therefore, when the cell frame signal (CF) and data with the value of all "0" are inputted as shown ①and ②, a cell enable signal designating an invalid cell is outputted from a flip-flop 29.

Figure 7:
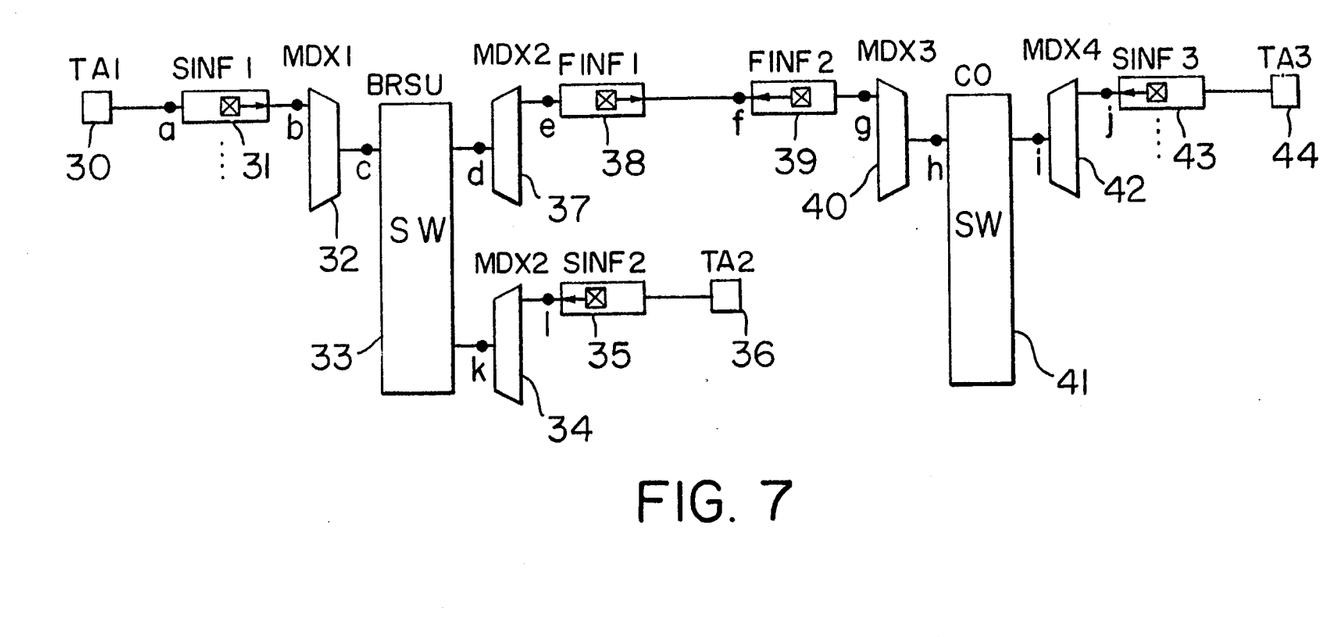
FIG. 7 is the block diagram showing the configuration of the broadband ISDN transmission system.

FIG. 7 is the block diagram showing the configuration of an embodiment of the broadband ISDN system according to the present invention. In FIG. 7, the system comprises, for example, a sending terminal adapter (TA1) 30, receiving terminal adapters (TA2, TA3) 36 and 44, subscriber line interfaces (SINF) 31, 35, and 43, multiplexers/demultiplexers (MDX) 32, 34, 37, 40, and 42, a broadband remote switch unit (BRSU) 33, fiber loop interfaces (FINF) 38, and 39, and a central office switch 41.

In FIG. 7, the path route test device shown in FIG. 5 is provided at the input portion of each device in the system if data are transmitted from the terminal adapter (TA1) 30, and a valid cell detector for detecting the arrival of a valid cell is provided if one path only is established in the system.

If one path only is established from the terminal adapter 30 to terminal adapter 36, then each determination result of VCD at any of a, b, c, k, and l should indicate the arrival of a valid cell. Likewise, if one path only is established to terminal adapter 44, then VCDs at any of a, b, c, d, e, f, g, h, i, and j should indicate the arrival of a valid cell.

In the former case, if the VCDs at k and l do not detect the arrival of a valid cell, then the switch 33 can have an internal fault or exact switching information cannot be provided by MDX 32. Then, these two factors should be checked. If the detector or the test device is not provided, then the only method of specifying a fault is to sequentially measuring input/output data of each device using an oscilloscope or a logic analyzer.

Since a terminal adapter is often located apart from a main system, a test cell generating device should be provided in the subscriber line interface (SINF) or the fiber loop interface (FINF), thus successfully conducting a path test within a small area.

For example, a test can be conducted only for a central office by generating a test cell from FINF 38. The central office in this embodiment includes FINF 39 through SINF 43. Simultaneously generating test cells by both FINF 38 and SINF 43 enables a determination to be made as to whether a fault has arisen in the direction from a BRSU to a CO or from a CO to a BRSU. A broadband remote station having a BRSU includes SINF 31 through 35 and FINF 38.

In an online path test, a path test using a test cell is conducted such that an invalid cell is detected where the test cell is generated and the invalid cell is replaced with the test cell.

As described above, the present invention realizes a validity check of a path route and a monitor a bit stack through an online operation without a measuring unit, and enables a fault to be detected at its earlier stage even during a system test, thereby improving the reliability of a system and facilitating the maintenance of the system.

What is claimed is:

1. An asynchronous transfer mode transmission system for transmitting cell-formatted data in an asynchronous transfer mode, comprising:
    switching means for switching an asynchronous transfer mode cell; and
    valid cell detecting means, provided at an optional point including said switching means in a path route established in said asynchronous transfer mode transmission system, for detecting arrival of a valid cell upon receipt of a cell enable signal indicating that the valid cell to pass through the path route has been sent, and for partially or entirely validity-checking the path route.

2. The asynchronous transfer mode transmission system according to claim 1 further comprising:
    test cell sending means, provided at an optional point in said asynchronous transfer mode transmission system, for sending a path route test cell, wherein
    said one or more valid cell detecting means provided at one or more points in the path route through which the test cell should pass validity-check the path route for a section from said test cell sending means to said valid cell detecting means upon receipt of said cell enable signal.

3. The asynchronous transfer mode transmission system according to claim 1, wherein
    said cell enable signal indicates "0" for a valid cell and "1" for an invalid cell.

4. The asynchronous transfer mode transmission system according to claim 3, wherein
    said valid cell detecting means comprises:
    inverter means for inverting said cell enable signal; and
    D flipflop means whose clock terminal receives an output of said inverter means and whose data input terminal receives a voltage of level "1".

5. A path route test apparatus for use in an asynchronous transfer mode transmission system for transmitting cell-formatted data in an asynchronous transfer mode through a switching means for switching an asynchronous transfer mode cell comprising:
    means for providing a cell enable signal indicating that a valid cell passes through a path route;
    a valid cell detecting means, provided at an optional point including said switching means in the path route established in said asynchronous transfer mode transmission system, for detecting arrival of a valid cell upon receipt of said cell enable signal and for validity-checking the path route.

6. The path route test apparatus for use in an asynchronous transfer mode transmission system according to claim 5 wherein said cell enable signal providing means comprises
    a shift register means for receiving a cell frame signal:
    a means for detecting a value of asynchronous transfer mode data corresponding to a virtual path identifier and a virtual cell identifier; and
    a means for detecting that said asynchronous transfer mode data is invalid upon a receipt of the cell frame signal.

7. An asynchronous transfer mode transmission system for transmitting cell-formatted data in an asynchronous transfer mode comprising:
    a switching means for switching an asynchronous transfer mode cell:
    means for providing a cell enable signal indicating that a valid cell passes through a path route; and
    a valid cell detecting means, provided at an optional point including said switching means in the path route established in said asynchronous transfer mode transmission system, for detecting arrival of a valid cell upon receipt of said cell enable signal and for validity-checking the path route.

8. The asynchronous transfer mode transmission system according to claim 7 wherein said cell enable signal providing means comprises:
a shift register means for receiving a cell frame signal:
a means for detecting a value of asynchronous transfer mode data corresponding to a virtual path identifier and a virtual cell identifier; and
a means for detecting said asynchronous transfer mode data is invalid upon a receipt of a cell frame signal.

9. An asynchronous transfer mode transmission system for transmitting cell-formatted data in an asynchronous transfer mode, comprising:
switching means for switching an asynchronous transfer mode cell;
valid cell detecting means, provided at optional points including said switching means in a plurality-of path routes established in said asynchronous transfer mode transmission system, for detecting arrival of a valid cell upon receipt of a cell enable signal indicating that the valid cell has been sent;
virtual path identifier and virtual channel identifier comparing means for storing a set of a virtual path identifier and a virtual channel identifier added to a cell to be transmitted through said points, and for comparing values of the virtual path identifier and virtual channel identifier stored therein with values of a virtual path identifier and a virtual channel identifier added to an arriving cell; and
path route validity check means for partially or entirely validity-checking a path route in said asynchronous transfer mode transmission system when said valid cell detecting means has detected arrival of a valid cell and said virtual path identifier and virtual channel identifier comparing means has detected coincidences between virtual path identifiers and virtual channel identifiers.

10. The asynchronous transfer mode transmission system according to claim 9 further comprising:
test cell sending means, provided at an optional point in said asynchronous transfer mode transmission system, for sending a path route test cell;
said valid cell detecting means, said virtual path identifier and virtual channel identifier comparing means, and said path route validity check means at one or more points in a path route through which the test cell should pass that the path route can be validity-checked in said system using said test cell.

11. The asynchronous transfer mode transmission system according to claim 10, wherein
8-bit data are transmitted in parallel in said asynchronous transfer mode transmission system;
said test cell sending means sends two test cells, each of said cells having two values which are complement to each other as said virtual channel identifier; and
said path route validity check means monitors a bit stack in a path route of the system through outputs for said two test cells of said valid cell detecting means and said virtual path identifier and virtual channel identifier comparing means.

12. The asynchronous transfer mode transmission system according to claim 9, wherein
said cell enable signal indicates "0" for a valid cell and "1" for an invalid signal.

13. The asynchronous transfer mode transmission system according to claim 12, wherein
said valid cell detecting means comprises:
inverter means for inverting said cell enable signal; and
D flipflop means whose clock terminal receives an output of said inverter means and whose data input terminal receives a voltage of level "1".

14. The asynchronous transfer mode transmission system according to claim 9, wherein
said virtual path identifier and virtual channel identifier comparing means comprises:
virtual path identifier and virtual channel identifier table means for storing values of a virtual path identifier and a virtual channel identifier added to a cell to pass through said optional points;
virtual path identifier and virtual channel identifier monitor means for retrieving values of a virtual path identifier and a virtual channel identifier from a cell arriving at said optional point; and
comparing means for comparing contents of said virtual path identifier and virtual channel identifier table with an output of said virtual path identifier and virtual channel identifier monitor means, and
said path route validity check means comprises:
AND gate means for receiving an output of said comparing means and an output of said valid cell detecting means.

15. A path route test apparatus for use in an asynchronous transfer mode transmission system for transmitting cell-formatted data in an asynchronous transfer mode through switching means for switching an asynchronous transfer mode cell comprising;
valid cell detecting means, provided at optional points including said switching means in a plurality of path routes established in said asynchronous transfer mode transmission system, for detecting arrival of a valid cell upon receipt of a cell enable signal indicating that the valid cell has been sent;
virtual path identifier and virtual channel identifier comparing means for storing a set of a virtual path identifier and a virtual channel identifier added to a cell to be transmitted through said points, and for comparing values of the virtual path identifier and virtual channel identifier stored therein with values of a virtual path identifier and a virtual channel identifier added to an arriving cell; and
path route validity check means for partially or entirely validity-checking a path route in said asynchronous transfer mode transmission system when said valid cell detecting means has detected arrival of a valid cell and said virtual path identifier and virtual channel identifier comparing means has detected coincidences between virtual path identifiers and virtual channel identifiers.

16. The path route test apparatus according to claim 15, further comprising means for providing said cell enable signal comprising:
a shift register means for receiving cell frame signal;
a means for detecting a valid of data corresponding to virtual path identifier and a virtual cell identifier; and
a means for detecting that said asynchronous transfer mode data is invalid upon a receipt of a cell frame signal.

17. An asynchronous transfer mode transmission system for transmitting cell-formatted data in an asynchronous transfer mode, comprising:
- switching means switching an asynchronous transfer mode cell;
- means for providing a cell enable signal indicating that a valid cell passes through a path route;
- valid cell detecting means, provided at optional points including said switching means in a plurality of path routes established in said asynchronous transfer mode transmission system, for detecting arrival of a valid cell upon receipt of said cell enable signal;
- virtual path identifier and virtual channel identifier comparing means for storing a set of a virtual path identifier and a virtual channel identifier added to a cell to be transmitted through said points, and for comparing values of the virtual path identifier and virtual channel identifier stored therein with values of a virtual path identifier and a virtual channel identifier added to an arriving cell; and
- path route validity check means for partially or entirely validity-checking a path route in said asynchronous transfer mode transmission system when said valid cell detecting means has detected arrival of a valid cell and said virtual path identifier and virtual channel identifier comparing means has detected coincidences between virtual path identifiers and virtual channel identifiers.

18. A method for transmitting cell-formatted data in an asynchronous transfer mode, comprising steps of:
- switching an asynchronous transfer mode cell; and
- at an optional point in a path route established in a transmission in the asynchronous transfer mode, detecting arrival of a valid cell upon receipt of a cell enable signal indicating that the valid cell to pass through the path route has been sent and performing an operation of validity-checking the path route.

19. A method of transmitting cell-formatted data in an asynchronous transfer mode, comprising steps of:
- switching an asynchronous transfer mode cell; and
- at optional points in a plurality of path routes established in an asynchronous transfer mode transmission, detecting arrival of a valid cell upon receipt of a cell enable signal indicating that the valid cell has been sent;
- storing a set of a virtual path identifier and a virtual channel identifier added to a cell to be transmitted through said points, comparing
- path route validity check values of the virtual path identifier and virtual channel identifier stored therein with values of a virtual path identifier and a virtual channel identifier added to an arriving cell; and
- validity-checking a path route in said asynchronous transfer mode transmission when arrival of a valid cell and coincidences between virtual path identifiers and virtual channel identifiers.

* * * * *